Sept. 26, 1950     N. H. SMITH     2,523,598
DISK BRAKE
Filed Sept. 28, 1949
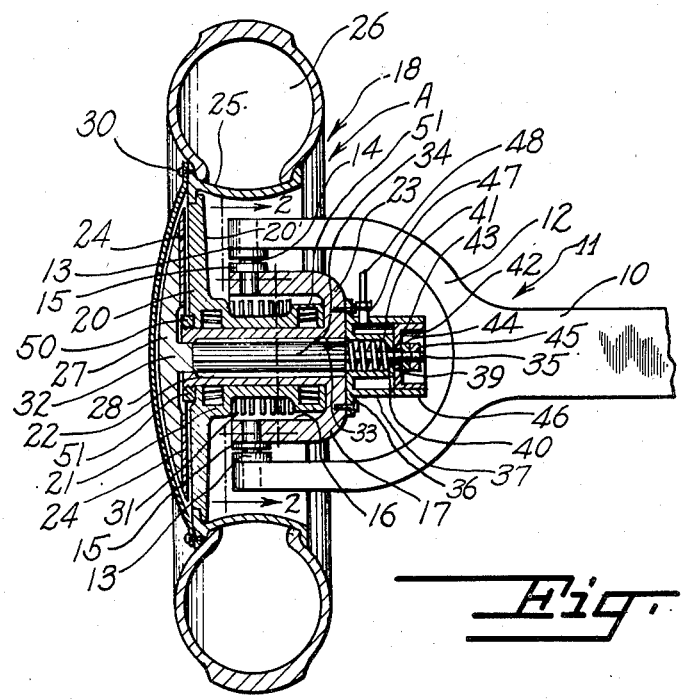
INVENTOR.
Neville H. Smith Patented Sept. 26, 1950

2,523,598

UNITED STATES PATENT OFFICE 2,523,598

DISK BRAKE

Neville H. Smith, Athens, Tenn.

Application September 28, 1949, Serial No. 118,235

2 Claims. (Cl. 188—152)

This invention relates to braking means for the steering wheels of an automobile and the like.

An object of the invention is the provision of a simple and efficient braking means for the front wheels of an automobile or the like in which a disk is reciprocated into braking position by a fluid under pressure, said disk being operated and supported by a stem drawing axially through a hollow axle carrying the hub of the wheel so that the disk having a friction material may be moved into engagement with a friction surface of the wheel, a hub cap or other enclosure housing the disk.

Another object of the invention is the provision of a braking means for the front wheels of a vehicle in which a disk housed within the hub cap of a wheel has an operating stem mounted axially within a hollow axle receiving the hub and reciprocated by a piston in a cylinder attached to the bight portion of a fork upon which the axle is pivoted, the stem at the inner end thereof being connected to a piston which is reciprocated in one direction by a fluid under pressure and in an opposite direction by a spring.

A further object of the invention is the provision of a braking means for an automobile or annular wheel in which a braking disk having a friction material located at the exterior face of the wheel and housed by the hub cap is adapted to be shifted inwardly for engagement with a disk face on the wheel, the disk being held against rotation by complemental means on a reciprocating stem and a hollow axle carried rigidly by a fork pivoted in the usual fork at each end of the front axle, means being employed for reciprocating the stem and the attached disk.

Other objectives of this design are:

To provide a working and useful design of a brake permitting a central ideal location of steering pivots when used on the steering end of a vehicle, providing safer steering and braking.

To provide extremely long, trouble free service by completely sealing out damaging dirt, grit, water, and the like.

To provide ample braking area with fast cooling and visible simplicity.

To make possible extremely simple, efficient and fast servicing and replacement.

To more nearly utilize a combination wheel and brake assembly for efficiency, strength, light weight and performance.

The invention is best understood from a consideration of the following detailed description taken in connection with the accompanying drawing, nevertheless, it must be borne in mind that the invention is susceptible of such changes and modifications as shall define no material departure from the salient features of the invention as expressed in the appended claims.

Figure 1 is a longitudinal vertical section of a front vehicle wheel taken along the line I—I of Figure 3, showing my improved braking mechanism;

Figure 2 is a transverse vertical section of a front wheel taken along the line 2—2 of Figure 1; and Figure 3 is a front view in elevation of a wheel showing a protection cover for my braking disc bolted to the wheel.

Referring more particularly to the drawing, 10 designates a front axle having a fork 11 at each end, the free ends of the arms 12 of the fork are provided with bearings 13 to receive king pins 14. These vertically aligned pins are also received in adjacently disposed bearings 15 formed in the free ends of the arms 16 of the cup-shaped member 17 which when rocked steers the front wheels 18 of the vehicle.

Both of the front wheels are of identical construction and each has a disk 20 having a conical rear wall 20' for sake of rigidity and providing the main supporting part. A hub 21 is mounted on a hollow axle or spindle 22 integrally formed with or rigidly connected to the center of the bight portion 23 of the cup-shaped member 17. A removable rim 25 of well known type is mounted on the usual flange at the periphery of the disk for supporting the tire 26. A hub cap of the snap on type may be employed for housing a friction disk 27 or a bowed cover plate 28 may be used. This plate has a perforated peripheral flange 29 which is bolted at 30 to the rim of the wheel. Fins 31 may be part of the hub of the wheels for cooling purposes. The inner face of the disk 27 is provided with a suitable friction facing 24 cooperating with the disk 20 to effect braking action, although said friction facing may be carried by the disk 20 if so desired.

The disk 27 is reciprocated by a rod or stem 32 mounted longitudinally and axially of the hollow axle 22 carried by the cup-shaped member 17. The inner end of the stem is received by a horizontal passage 33 formed at the center of the bight portion 23 of the cup-shaped member 17. Said operating stem is provided with a suitable number of circumferentially arranged splines 34 which are received by complementally formed grooves in the wall of the passage 33 to prevent turning of the stem and disk 27 while permitting sliding movement thereof. The splines 34 are of a length so as to terminate quite close to the disk 27 to reduce any torsional deflection of the stem 32. The threaded reduced end or rod 35 projects inwardly from the stem or rod 32.

A plate 36 is bolted to the bridging portion 23 at the rear face thereof. A sleeve 37, having the outer end in open communication with the passage 33 is formed integrally or connected rigidly with the bridging portion. The opposite end 38 has an opening 40 to receive the extension rod 35. A compression spring 41 is mounted on the rod and has one end abutting the inner end of the stem 32 while the other end is in engagement with the inner end 39 of the sleeve 37. This spring tends at all times to move the stem outwardly of the axle 22 and the disk 27 and associated friction facing away from the disk 20.

A piston 42 has an opening 43 receiving the extension rod 35 and nuts 44 and 45 screwed into the inner free end of said rod attach the piston to the rod which provides for adjustment and removal of disc 27. A single self-locking nut may be employed, if desired. A cylinder 46, formed integrally with the plate 36, embraces the piston. A nipple 47, threaded into an opening in the cylinder, is in communication with a tube 48 which supplies compressed air or other fluid to the cylinder when the usual brake pedal is depressed.

A conventional form of retaining means is indicated in Figure 1 for retaining the hub 21 on the hollow axle 22. A nut 50 is screwed onto the outer threaded end of said axle. Bearings 51 are supplied for the hub, and are of such construction as to withstand the braking thrusts between the disks 20 and 27, as well as the various loadings of the wheel during operation.

The operation of my device is as follows:

It is only necessary to depress the brake pedal of the automobile whence fluid under pressure is forced into the cylinder from the tube 48 against the piston 42. Said piston forces the stem 32 inwardly and draws the braking disk 27 into frictional relation with the outer face of the disk of the automobile wheel for any degree of braking effort. Release of pressure on the brake pedal allows the brake disc to release by virtue of the tension of the spring 41 in the sleeve 37.

The splines 34 cooperate with the complemental grooves in the bridging member 23 of the cup-shaped member 17 from turning in order to retain the wheel against rotation. While the member 17 is rocked for turning the front wheels during steering such rocking does not affect the action of the braking disc since the wheels carry the entire assembly which operates the disk.

It will be noted that the brake cylinder is remotely located with respect to the friction surfaces of the brake, thus preventing the passage of braking fluid to such surfaces insuring an efficient braking action at all times, and this location of the cylinder likewise allows complete inspection, maintenance or replacement of parts, without the necessity of raising and lowering the wheel to effect such repairs.

What I claim:

1. In an automobile wheel having a limited rocking movement in a fork at the end of a front axle, a cup-shaped member pivoted for rocking movement in the fork, a hollow spindle projecting outwardly from an intermediate portion of the cup-shaped member to receive the hub of the wheel, the outer surface of the wheel having a face, a reciprocating stem received by the hollow spindle, a disk rigid with the outer end of the stem and having a friction facing adapted to engage the face of the wheel, cooperating means on the stem and cup-shaped member to prevent rotation of said stem, fluid operated means for reciprocating the stem and for moving the disk and friction facing into contact with the face of the wheel and a spring for moving the disk away from said face.

2. In an automobile wheel having a limited rocking movement in a fork at the end of a front axle, a cup-shaped member pivoted for rocking movement in the fork, a hollow spindle projecting outwardly from an intermediate portion of the cup-shaped member to receive the hub of the wheel, the outer surface of the wheel having a brake surface, a reciprocating stem received by the hollow spindle, a friction disk rigid with the outer end of the stem and adapted to engage the brake surface of the wheel, means retaining the stem against rotation, a cylinder attached to and projecting inwardly from the cup-shaped member, a piston in the cylinder attached to the stem, means for supplying fluid under pressure to the cylinder so that the piston will draw the friction disk tight against the brake surface of the wheel, and a spring for reciprocating the stem to cause the disk to be moved away from the wheel when the fluid pressure has been released.

NEVILLE H. SMITH.

REFERENCES CITED

The following references are of record in the file of this patent:

UNITED STATES PATENTS

| Number | Name | Date |
|---|---|---|
| 1,858,257 | Zancan | May 17, 1932 |

FOREIGN PATENTS

| Number | Country | Date |
|---|---|---|
| 265,650 | Great Britain | July 8, 1926 |